United States Patent [19]
Rowe

[11] Patent Number: 5,209,178
[45] Date of Patent: May 11, 1993

[54] DUAL POSITION BOAT SEAT

[76] Inventor: Jerry D. Rowe, 2186 N. 2nd St., Lander, Wyo. 82520

[21] Appl. No.: 666,584

[22] Filed: Mar. 8, 1991

[51] Int. Cl.⁵ ............................................. B60N 1/10
[52] U.S. Cl. .................................... 114/363; 297/217
[58] Field of Search .......................... 114/363; 297/217

[56] References Cited

U.S. PATENT DOCUMENTS 3,839,757 10/1974 Grimes ................................. 114/363
3,884,522 5/1975 Arima et al. ......................... 114/363

Primary Examiner—Sherman Basinger
Assistant Examiner—Thomas J. Brahan
Attorney, Agent, or Firm—Andrus, Sceales, Starke & Sawall

[57] ABSTRACT

A fishing boat has a flat inner floor with a front operating station having a seat moveable between a lower run position and a raised fishing position. A base frame includes abutting box-like members having a common wall. The frame is secured to the floor with a base plate secured to the first forward box-like portion. The rearward frame box-like portion defines a recess to receive a cooler having a raised and flat top wall. A non-load bearing hinge unit in the form of arms or a single plate has a length greater than the vertical distance between the base plate and the top wall of the cooler. The hinge unit is secured to the rear edge of the base plate for folding onto the base plate, with the seat abutting the base plate and without any load on the hinge unit. The seat plate is secured to the outer end of the hinge unit and folds onto the base plate in the folded position. In an unfolded position, the hinge unit locates the seat plate in a raised position resting on the top wall of the cooler, without any load on the hinge unit.

11 Claims, 2 Drawing Sheets

DUAL POSITION BOAT SEAT

BACKGROUND OF THE PRESENT INVENTION

This invention relates to a dual position boat seat having two alternate vertical seating positions and particularly to such a boat seat for a power boat having a run control position and an alternate raised fishing position.

Power boats often require multiple seat positioning for various functions appropriately carried out in the boat. Large power boats have raised running stations at which the operator can stand or sit for seating at a level of adjacent seating units for passengers and the like. Fishing boats, in particular power fishing boats, have a seat adjacent the control station for operating of the boat at relatively high speeds over the water. For fishing however, a raised swivel seat is generally desired to allow rapid movement by the fisherman into different orientations over the water with respect to the boat. This allows the operator to select the casting or other placement of his line most advantageously.

Various seat structures have been suggested for alternate vertical positioning. U.S. Pat. No. 3,428,976. which issued Feb. 25, 1969, discloses a large power boat seating structure in which a swivel seat is located in a vertical guide structure for location between a raised running position and a lowered social seating position. The seat is provided with a vertical guide structure secured to the side wall of the boat immediately adjacent the running station in combination with a replaceable vertical support rod for supporting of the outer side of the seat spaced from the side wall. U.S. Pat. No. 3,839,757, which issued Oct. 8, 1974, discloses a fishing boat seat structure in which a swivel seat is mounted to a support plate and mounted to a centrally located chest structure by a pair of linkage members or legs pivotally secured to the side of the chest structure and to the seat platform. The pivoted legs provide for alternate positioning of the seat in a lowered position resting on the chest structure for powered operation of the boat. Alternatively, the swivel legs permit pivoting of seat structure upwardly above the chest structure and supporting of the swivel seat in a raised position on the legs, with the upper ends of the legs latched to a vertical inclined support in the boat to lock the legs in the raised position and seat supported on the pivot legs.

Thus, although various vertical seat supports have been suggested for power boats and the like, they generally require special internal boat structures and relatively multiple part support structures. Although operable, the structures could require some significant maintenance to maintain a smooth, effective operation. Further, the seat structure should provide a simple but rigid and strong support to permit rapid positioning and have sufficiently rugged construction to permit use without particular attention to the structure in changing the seat position.

SUMMARY OF THE PRESENT INVENTION

The present invention is particularly directed to a dual position seat structure for a power boat or the like and includes a simple folding support structure for the seat including a seat base resting alternately on a flat support member on the boat floor in the run position and a flat raised support member in a raised position, with a simple non-load bearing hinge unit connected to form a folding support unit interposed between a base support structure and a seat bottom unit, with the hinge unit in a folded position having a seat unit resting on the support member and with the hinge unit and bottom unit unfolded and raised having the seat unit resting directly on the raised support in the fishing position and connected by the hinge unit but with the hinge unit in an unstressed position or state in both positions. Thus, in the run position, the folding support structure unit is folded downwardly onto the base floor support with the seat resting on the folded support unit. The hinge unit is unfolded to move the seat upwardly onto an adjacent horizontal raised support member, with the unfolded hinge support unit extending between the base structure and the upper support member. In both positions, the weight is supported by a suitable horizontal support structure without a connecting load on the folding support or hinge unit.

In a particularly unique and practical construction, the lower or base support structure is secured within the boat with a rigid plate upper base plate member. The non-load bearing hinge unit, in the form of a plate or simple hinge arms, is secured to the back edge of the base plate and to an edge of a rigid seat plate. The seat is secured to the seat plate by a suitable swivel support. In addition, a raised plate-like support member is formed by a removable unit, such as the cooler widely used in outdoor activities and including boating. The cooler is mounted slightly spaced from the base plate such that with the hinge unit unfolded, the seat plate is located to rest directly on the top wall of the cooler. In a preferred construction, the base plate is supported on a base frame to form the base support structure for attachment to the floor of the boat. The under structure projects rearwardly from the base plate and is provided with an adjacent recess within which the cooler or the like is firmly but releasably mounted. The under structure can be formed in any suitable manner and in a very simple construction it is formed by suitable wood framing lumber.

Thus, the present invention provides a simple hinged-type structure for a collapsible seat which collapses to a folded structure for the run position and unfolds with the seat resting on a separate rigid support in the second raised position for fishing or the like. The structure is readily formed from available material and provides a rugged seat structure which can be conveniently applied with minimal construction, cost and changes in the boat structure.

BRIEF DESCRIPTION OF THE DRAWINGS

The drawings furnished herewith illustrate the best mode presently contemplated for carrying out the invention and are described hereinafter.

In the drawings.

DESCRIPTION OF THE ILLUSTRATED EMBODIMENT

Figure 1:
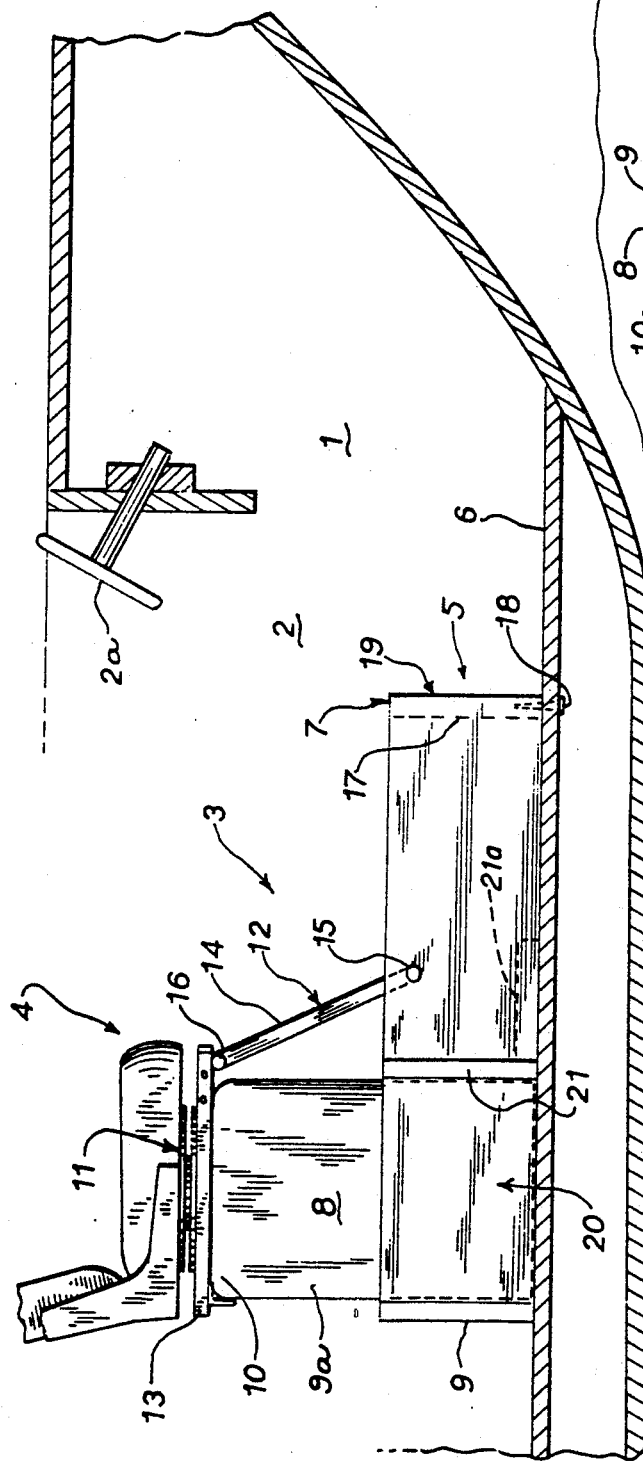
FIG. 1 is a side elevational view of a power boat with parts broken away to illustrate an embodiment of the present invention, with a seat located in a raised fishing position.
Figure 2:
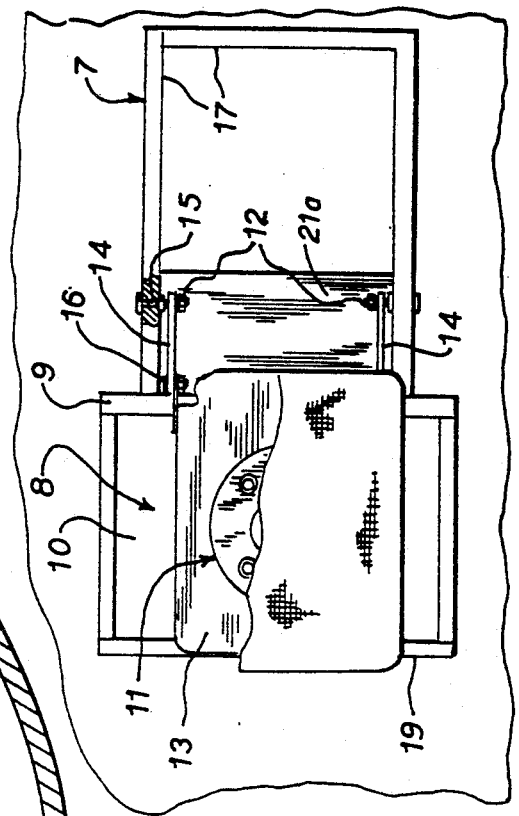
FIG. 2 is a plan view of the seat structure shown in FIG. 1.
Figure 3:
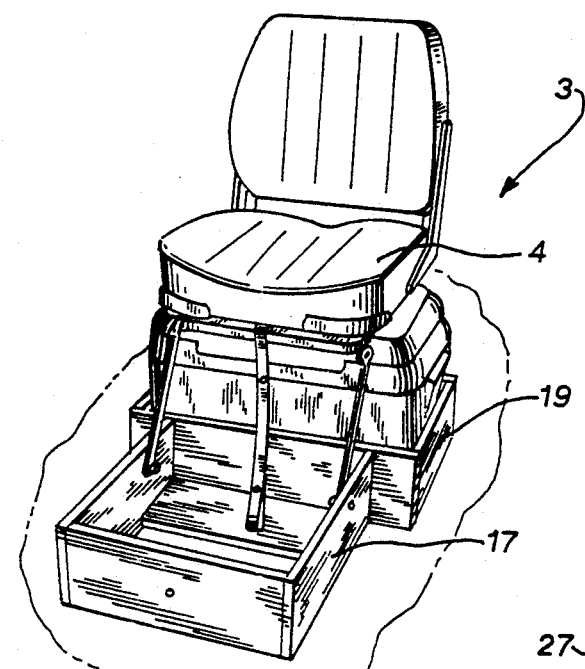
FIG. 3 is a pictorial view of a seat structure constructed as shown in FIGS. 1 and 2, and in the fishing position.

Referring to the drawings and particularly to FIG. 1, the forward end of a power boat 1 is illustrated which is typical of those used for recreational purposes such as skiing and the like as well as for fishing. The power boat 1 includes a steering station 2 adjacent the forward portion of the boat 1 having a steering wheel 2a, which is connected to a suitable power unit, not shown, secured to the trailing end of the boat. A seating unit or assembly 3 is located at the steering station and includes a seat 4, which is adapted to be located between a raised fishing position, as shown in FIG. 1, and then lowered to a run position, as shown in FIG. 2. The boat structure as such may be of any suitable construction. The present invention is particularly directed to the construction of the seat assembly 3 for positioning of the seat 4 between the two vertical positions, as shown in FIGS. 1 and 3.

Generally, the seat assembly 3 includes a base support frame structure 5 secured to the flat boat floor 6. Thus, most boats have a dual hull structure with a raised floor 6 located in upwardly spaced relation to the shaped outer hull to provide a flat walking floor. A seat base unit 7 is secured within the forward portion of the frame structure 5. The rearward portion of the frame structure 5 defines a laterally extended recessed guide and support unit 9 with a conventional cooler 8 supported within the recessed guide and support unit. The cooler 8 is illustrated as a conventional cooler having a relatively deep base 9a and a flat top cover 10. The cover 10, and particularly the upper surface thereof, defines an upper support plate for supporting of the seat in the fishing position, as shown in FIG. 1.

The seat 4 is secured by a swivel unit 11 to a flat seat plate 13. A hinge assembly or unit 12, including a pair of side hinge arms 14, is interconnected between the seat base unit 7 and the seat plate 13, with each hinge arm having a similar connection. In the illustrated embodiment, a hinge pin 15 interconnects the one edge of the hinge arm 14 to the seat base unit 7. The outer edge of the hinge arm 14 is connected by a similar hinge pin 16 to the forward edge of the seat plate 13. The hinge arms 14 thus define legs or arms between the hinge pins 15 and 16 which, in the illustrated embodiment, has a length slightly in excess of the vertical dimension or space between the top of the support cover plate 10 and the base plate 7. The hinge unit 12 and the seat plate 13 thus define a folding structured connected to the seat base unit 7. In the run position of FIG. 4, the hinge arms 14 are folded downwardly within the seat base unit 7 with the seat plate 13 folded downwardly into resting engagement on the frame structure 5. In the unfolded position shown in FIG. 1, the hinge unit 14 is unfolded to a horizontal position from the upper edge of the hinge plate and rest on the cooler cover 10, which forms the upper fishing position for the seat assembly 3.

The illustrated structure provides a preferred construction of forming the seat structure but various modifications can of course be used to provide an integrated folding structure with the seat resting directly on vertically spaced rigid support plates or structures. The preferred construction is more fully described as follows.

Figure 4:
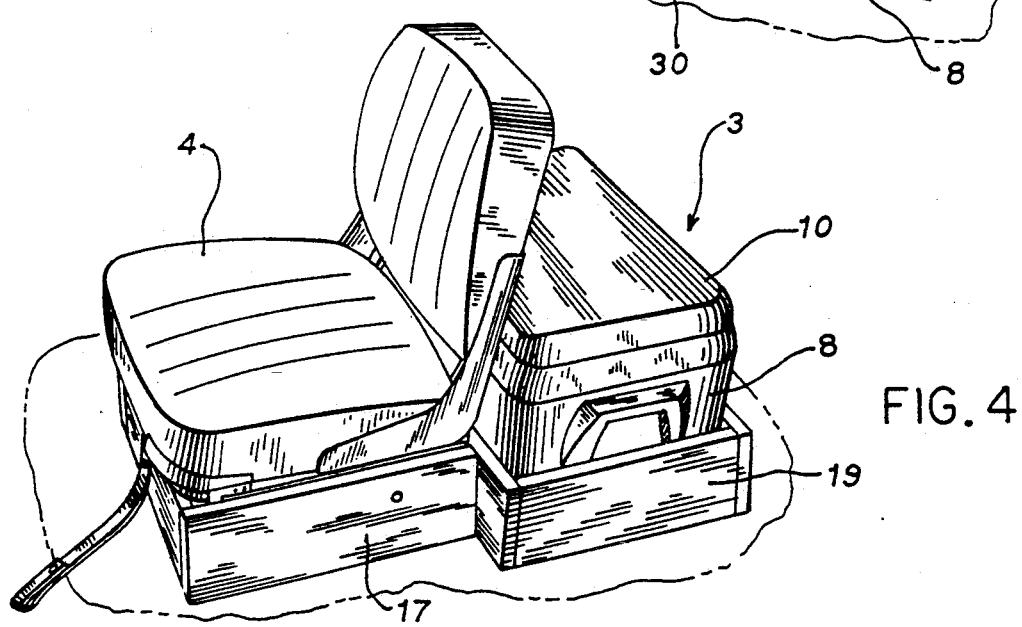
FIG. 4 is a view of the seat structure shown in FIG. 3, with the seat in the lowered boat run position.

Referring particularly to FIGS. 3 and 4, the base support frame structure 5 includes units 7 and 9 in the form of spaced vertical boards 17 resting on the floor 6 of the boat and secured thereto by any suitable means such as simple screws 18. The boards form an upstanding vertical assembly defining the support structure 5 having box-like seat base unit 7 and a box-like cooler unit 9 with a common cross-brace wall 21 centrally of the outer vertical boards 17 to provide a rigid supporting structure. The unit 7 is configured to receive the seat plate 13, with the seat plate 13 resting on the top of the box-like unit 7, as shown in FIG. 4. The box-like cooler unit 9 defines a recess providing a reasonable snug fit between the cooler 8 and the vertical boards 17 and board 21.

More particularly in the illustrated embodiment of the invention of FIGS. 1–4, the hinge arms 14 are shown as two straps of a suitable rigid metal or other material. The ends of the arms 14 are apertured to receive the hinge pin 15 which is secured to the edge of the vertical boards 17 form the sidewalls of the base unit 7. The illustrated depth of the hinge arms 14 is slightly in excess of the vertical distance between the base unit 7 and the cooler cover 10. The hinge arms 14 and pins 15 allow the hinge structure or unit to fold and collapse onto the base unit 7 and to expand upwardly of the cooler cover 10. In the unfolded position, the hinge arms angle rearwardly slightly to allow the seat plate 13 to rest on the top cover 10 of the cooler and in the folded position to allow the seat plate 13 to rest on the top of the seat base unit 7 and particularly the upper edges of boards 17 portion. The alternate position as previously described are shown in FIGS. 1 and 4.

The seat plate 13 includes a conventional swivel unit 11 to which the seat 4 is secured for rotation through 360 degrees, in accordance with well known and conventional constructions.

The several components, including the seat base unit 7, the seat plate 13 and the hinge arms 14 are formed of any suitable material and structure to provide for the folding and unfolding of the seat assembly. The use of simple wood members, which are moisture and rot resistance, provides a simple and inexpensive structure. The hinge arms 14 are not a structural member that support the seat and occupant in either of the operative positions, but only a pivotal interconnecting unit to provide for the guided interconnection and movement of the seat plate between the support plate and the raised horizontal rigid support shown as the seat cover. Thus, the several members are interrelated with necessary structural integrity and strength to establish direct force transmission between the two respective horizontal supports, namely, under structure including the base unit 7 and the cover 10. Thus, the several plate members and board members may be otherwise formed as with a frame member and interrelated bearing surfaces to directly transmit the forces without any significant force transmission through the hinge plate.

Figure 5:
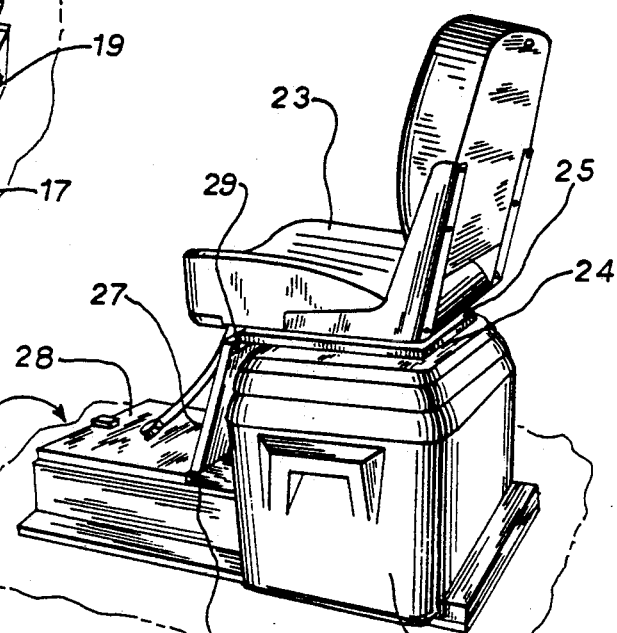
FIG. 5 is a view similar to FIG. 3 illustrating an alternate embodiment of the invention.

For example, the hinge arms may be replaced with a hinge plate such as shown in FIG. 5.

In the embodiment of FIG. 5, the seat 23 is secured by a swivel unit 24 to a flat seat plate 25. A hinge assembly or unit 26 includes a hinge plate 27 which interconnects the seat plate 25 to a base plate 28. 25 to a base plate In the illustrated embodiment, similar piano hinge units 29 and 30 interconnect the one edge of the hinge plate 27 to the base plate 28 and to the forward edge of the seat plate 25. The hinge plate 27 thus defines a leg between the hinge units 29 and 30 which, in the illustrated embodiment, has a length slightly in excess of the vertical dimension or space between the top of the cooler cover and the base plate 28. The hinge plate 27 and the seat plate 25 thus define a folding structure connected to the base plate 28, as in the first embodiment. In the run position, the hinge plate 27 is folded downwardly resting on the base plate 28 with the seat plate 25 folded downwardly into resting engagement on the hinge plate. In the unfolded position, the hinge plate 27 is unfolded to a vertical position with the seat plate 25 resting on the cooler cover.

The illustrated structures provide a preferred construction of forming the seat structure but various modifications can of course be used to provide an integrated folding structure, with the seat resting directly on vertically spaced rigid support plates or structures.

Various modes of carrying out the invention are contemplated as being within the scope of the following claims particularly pointing out and distinctly claiming the subject matter which is regarded as the invention.

I claim:

1. A boat seat assembly for recreational boats including two vertically spaced seating positions, comprising a seat mounting base structure having securement means for securing to the bottom of a boat, said base structure having a front portion and a rear portion, a hinged structure secured to the rear portion of the base structure and pivotal between a lowered position abutting the base structure and a raised position extending substantially upwardly from the rear portion of the base structure, a seat structure secured to the upper end of the hinged structure and foldable between a position abutting the base structure with the hinge structure locating within the base structure and a horizontal raised position with the hinged structure in the raised position, and a raised rigid support structure having a securement means for mounting within the boat in spaced relation to the base structure and having an upper horizontal rigid structure for receiving said seat structure with the hinged structure in the raised position and with the seat structure substantially supported by said horizontal rigid structure and the hinge structure is located with a minimal connecting load from said seat structure in said raised position or in said lowered position.

2. The boat seat assembly of claim 1 having a base support frame secured to said base structure, and a seat plate secured to said seat structure, and wherein said hinge unit includes a pair of hinge members secured to the opposite sides of said base structure and said seat plate.

3. The boat seat assembly of claim 2 wherein each of said hinge members is a rigid strap and including hinge pins securing the straps to the side edges of said base structure and said seat plate.

4. The boat seat of claim 1 wherein said base structure includes a frame for securement to the bottom of the boat and a base plate secured to the top of said frame, said frame projecting rearwardly from said base plate and defining a recess in spaced relation to the base plate, said rigid raised support structure including a separate removable base portion located within said recess and having a flat top wall attached to said base portion.

5. A boat seat assembly for locating of an operating seat in a lower run position and a raised fishing position, comprising a base frame structure having means for securing the frame structure to the bottom of a boat, said frame structure including a first box-like seat portion and a second confining portion, said first seat portion including a seat support unit defining a substantially horizontal planar seat support, said second confining portion defining a recess in close spaced relation to the seat portion, a cooler unit releasably located within said confining portion and having a flat top wall defining a substantially planar support surface raised above the seat support unit in accordance with the raised fishing position, a hinge unit having a length greater than the vertical distance between the seat support unit and said top wall of the cooler unit, means securing said hinge unit to the seat support unit and supporting of said hinge for folding onto said planar seat support and in a vertical position extending upwardly and outwardly of the seat support unit, a seat unit including a seat plate having a width generally corresponding to that of the seat support unit and a length slightly greater that the length of the hinge unit, means securing said hinge unit to an edge of said seat plate and supporting of said seat plate for a folded position abutting the planar seat support unit and an unfolded horizontal position located generally in the plane of the top wall of the cooler unit with the hinge unit unfolded and said seat plate in abutting supporting engagement with the top wall of the cooler unit, and in both said folded and unfolded states the seat unit is supported with a minimal loading of said hinge unit.

6. The seat assembly of claim 5 wherein said hinge unit includes strap-like members pivotally secured to opposite sides of the seat support unit and said seat plate.

7. The seat assembly of claim 5 wherein said frame structure includes a first and second box-like members connected by a common cross wall unit defining seat portion and said confining portion as a cooler recess for said cooler unit.

8. The boat seat assembly of claim 5, wherein said hinge unit includes a hinge plate having a length greater than the vertical distance between said seat support unit and said top wall of said cooler unit.

9. In combination, a fishing boat having an internal flat horizontal bottom wall, an operating station located within said boat, a seat support structure at said operating station secured to said bottom wall and projecting slightly upwardly therefrom, said support structure having a first frame base defining a first horizontal support surface adjacent said operating station, a hinge unit pivotally secured to a rearward portion of said base frame and having a first collapsed position within the said base frame and a second raised position pivoted to a generally vertical position, a seat unit having a seat plate pivotally connected to said hinge unit and having a lowered position abutting the base frame and a second position extending substantially perpendicular to said hinge unit and defining a substantially horizontal support position with the hinge unit located in said substantially vertical position, a horizontal support member secured to said seat support structure in rearwardly spaced relation to said base frame and defining a horizontal support surface generally in the plane of said seat plate in the unfolded position of the seat unit and hinge unit whereby said seat plate rests directly on said horizontal support member in the raised position and on said base frame in the collapsed position and thereby the weight of said seat unit is supported with a minimal connecting load on the hinge unit in both the lowered and raised positions.

10. The seat assembly of claim 9 wherein said hinge units includes a plurality of hinge members.

11. The seat assembly of claim 9 wherein said horizontal support structure includes a cooler, said seat support structure includes abutting first and second box-like frames having a common horizontal wall, said base plate being secured to said first box-like frame and said horizontal support structure, releasably secured to said second box-like frame.

* * * * *